United States Patent
Ito et al.

(10) Patent No.: US 11,650,665 B2
(45) Date of Patent: May 16, 2023

(54) TACTILE PRESENTATION APPARATUS AND TACTILE PRESENTATION CONTROL METHOD

(71) Applicant: SONY CORPORATION, Tokyo (JP)

(72) Inventors: Osamu Ito, Tokyo (JP); Yohei Fukuma, Tokyo (JP); Takeshi Ogita, Tokyo (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 17/284,937

(22) PCT Filed: Oct. 8, 2019

(86) PCT No.: PCT/JP2019/039566
§ 371 (c)(1),
(2) Date: Apr. 13, 2021

(87) PCT Pub. No.: WO2020/085069
PCT Pub. Date: Apr. 30, 2020

(65) Prior Publication Data
US 2021/0349538 A1    Nov. 11, 2021

(30) Foreign Application Priority Data
Oct. 22, 2018   (JP) .............................. JP2018-198495

(51) Int. Cl.
*G06F 3/01*     (2006.01)
*G05D 19/02*    (2006.01)

(52) U.S. Cl.
CPC ............. *G06F 3/016* (2013.01); *G05D 19/02* (2013.01)

(58) Field of Classification Search
CPC ....... G06F 3/016; G06F 3/0346; G05D 19/02; A63G 31/04
See application file for complete search history.

(56) References Cited

U.S. PATENT DOCUMENTS

| 2004/0008191 A1 | 1/2004 | Poupyrev et al. |
| 2008/0059131 A1 | 3/2008 | Tokita et al. |

(Continued)

FOREIGN PATENT DOCUMENTS

| CN | 102422244 A | 4/2012 |
| JP | 2004-021528 A | 1/2004 |

(Continued)

OTHER PUBLICATIONS

International Search Report and Written Opinion of PCT Application No. PCT/JP2019/039566, dated Jan. 7, 2020, 09 pages of ISRWO.

*Primary Examiner* — Quan Zhen Wang
*Assistant Examiner* — Mancil Littlejohn, Jr.
(74) *Attorney, Agent, or Firm* — Chip Law Group

(57) ABSTRACT

The present technology relates to a tactile presentation apparatus and a tactile presentation control method with which the types of tactile sensations which can be presented by means of vibration can be increased. The tactile presentation apparatus includes a first member and a second member which can vibrate individually and a first bending portion that bends between the first member and the second member and that changes the relative direction between the first member and the second member. The present technology can be applied to devices that a user operates while holding the device in a hand, for example in a theatrical performance, a movie, or an attraction.

18 Claims, 12 Drawing Sheets

(56) References Cited

U.S. PATENT DOCUMENTS

| | | |
|---|---|---|
| 2010/0283727 A1 | 11/2010 | Jiang et al. |
| 2017/0361223 A1 | 12/2017 | Gohara |
| 2019/0220095 A1 | 7/2019 | Ogita et al. |
| 2021/0099805 A1* | 4/2021 | Mikolajczyk .......... H04R 9/025 |

FOREIGN PATENT DOCUMENTS

| | | | |
|---|---|---|---|
| JP | 2008-123061 A | 5/2008 | |
| JP | 2008123061 A * | 5/2008 | ............. G06F 3/011 |
| JP | 2010-136151 A | 6/2010 | |
| JP | 2012-526331 A | 10/2012 | |
| JP | 2017-094271 A | 6/2017 | |
| JP | 2017094271 A * | 6/2017 | |
| JP | 2017-221427 A | 12/2017 | |
| KR | 10-2012-0019471 A | 3/2012 | |
| WO | 2018/066299 A1 | 4/2018 | |

\* cited by examiner

TACTILE PRESENTATION APPARATUS AND TACTILE PRESENTATION CONTROL METHOD

CROSS REFERENCE TO RELATED APPLICATIONS

This application is a U.S. National Phase of International Patent Application No. PCT/JP2019/039566 filed on Oct. 8, 2019, which claims priority benefit of Japanese Patent Application No. JP 2018-198495 filed in the Japan Patent Office on Oct. 22, 2018. Each of the above-referenced applications is hereby incorporated herein by reference in its entirety.

TECHNICAL FIELD

The present technology relates to a tactile presentation apparatus and a tactile presentation control method, and more particularly, to a tactile presentation apparatus and a tactile presentation control method that present a tactile sensation by vibration.

BACKGROUND ART

Conventionally, it has been proposed to change the pattern of the region where vibration is generated on a touch panel, according to the internal state of a mobile terminal when a user touches the touch panel of the mobile terminal (see, for example, PTL 1).

CITATION LIST

Patent Literature

[PTL 1]
Japanese Patent Laid-open No. 2010-136151

SUMMARY

Technical Problem

By the way, in a device that presents a tactile sensation to a user by vibration, such as a mobile terminal described in PTL 1, the types of tactile sensations that can be presented are limited by the vibration direction of the device that generates vibration.

The present technology is made in view of such a situation and makes it possible to increase the types of tactile sensations that can be presented by vibration.

Solution to Problem

The tactile presentation apparatus of the first aspect of the present technology includes a first member and a second member that vibrate individually and a first bending portion that bends between the first member and the second member and that changes a relative direction between the first member and the second member.

In the tactile presentation control method of the second aspect of the present technology, a tactile presentation apparatus provided with a first member and a second member that vibrate individually and a bending portion that bends between the first member and the second member and that changes the relative direction between the first member and the second member controls at least one of a vibration of the first member or a vibration of the second member.

In the first aspect of the present technology, the relative relation between the vibration directions of the first member and the second member which vibrate individually changes.

In the second aspect of the present technology, the relative relation of the vibration directions of the first member and the second member that vibrate individually changes, and at least one of the vibration of the first member or the vibration of the second member is controlled.

DESCRIPTION OF EMBODIMENTS

Hereinafter, modes for implementing the present technology will be described. The description will be given in the following order.

1. First embodiment
2. Second embodiment (example in which the vibration direction does not agree with the longitudinal direction of the grip portion)
3. Third embodiment (example in which the grip portion can be separated at the bending portion)
4. Fourth embodiment (example in which the grip portion can be separated at a portion other than the bending portion)
5. Fifth embodiment (example in which two bending portions are provided)
6. Sixth embodiment (example in which three vibrating portions are provided)
7. Modification examples
8. Others

1. FIRST EMBODIMENT

First, the first embodiment of the present technology will be described with reference to FIGS. 1, 2, 3A, 3B, 4A, 4B, 5A, 5B, 6, 7, 8A, 8B, and 8C.

<Configuration Example of Tactile Presentation Apparatus 1>

Figure 1:
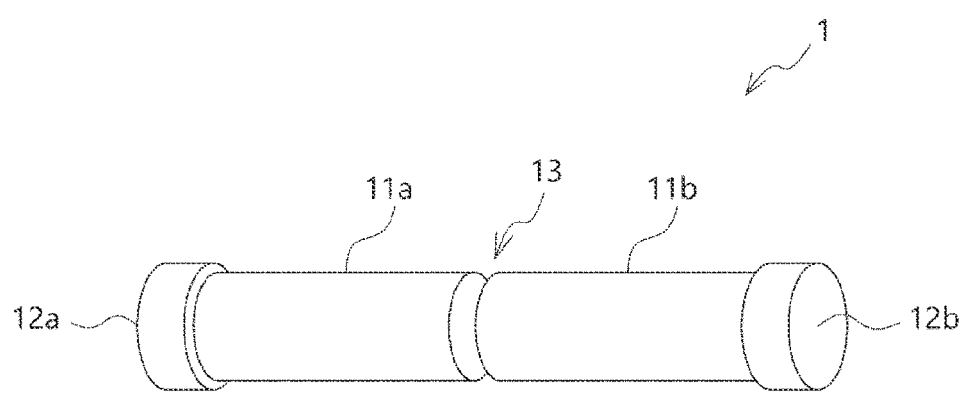
FIG. 1 is an external view schematically illustrating a configuration example of a first embodiment of a tactile presentation apparatus to which the present technology is applied.

FIG. 1 is an external view schematically illustrating a configuration example of a tactile presentation apparatus 1 to which the present technology is applied.

The tactile presentation apparatus 1 includes a grip portion 11a, a grip portion 11b, a vibrating portion 12a, a vibrating portion 12b, and a bending portion 13. The tactile presentation apparatus 1 is a device that presents a tactile sensation by vibration. For example, the tactile presentation apparatus 1 allows the user to experience a predetermined tactile sensation by transmitting vibration to the user's hand while the user holds at least one of the grip portion 11a or the grip portion 11b. Further, for example, the tactile presentation apparatus 1 is transformed by bending the bending portion 13, and represents a plurality of different items (for example, a sword or a gun) by changing the tactile sensation given to the user.

The grip portion 11a and the grip portion 11b include rod-shaped members having the same length and same cross-sectional radius. A cylindrical vibrating portion 12a is provided at one end of the grip portion 11a, and the other end of the grip portion 11a is connected to one end of the grip portion 11b via the bending portion 13. At the other end of the grip portion 11b, a cylindrical vibrating portion 12b similar to the vibrating portion 12a is provided.

The vibrating portion 12a includes, for example, a vibrating device, such as an actuator, and generates vibration in a direction parallel to the side surface of the cylinder, thereby giving the vibration to the grip portion 11a in the longitudinal direction. As a result, the grip portion 11a vibrates in the longitudinal direction independently of the grip portion 11b.

Similarly to the vibrating portion 12a, the vibrating portion 12b includes, for example, a vibrating device, such as an actuator, and generates vibration in a direction parallel to the side surface of the cylinder, thereby giving the vibration to the grip portion 11b in the longitudinal direction. As a result, the grip portion 11b vibrates in the longitudinal direction independently of the grip portion 11a.

The bending portion 13 is provided at a connecting portion between the grip portion 11a and the grip portion 11b and bends around a predetermined bending axis. As the bending portion 13 bends, the angle between the grip portion 11a and the grip portion 11b changes, and the relative direction between the grip portion 11a and the grip portion 11b (the relative relation between the orientation of the grip portion 11a and the orientation of the grip portion 11b) changes. As a result, the angle formed by the vibration direction of the grip portion 11a (vibrating portion 12a) and the vibration direction of the grip portion 11b (vibrating portion 12b) changes, and the relative relation between the vibration directions of the two changes.

Note that the configuration of the bending portion 13 is not particularly limited. For example, the bending portion 13 may be provided separately from the grip portion 11a and the grip portion 11b. In this case, for example, the bending portion 13 includes a hinge or the like and also functions as a connecting portion that connects the grip portion 11a and the grip portion 11b. Alternatively, the bending portion 13 may be formed by combining one end of the grip portion 11a and one end of the grip portion 11b.

Further, the angle at which the bending portion 13 bends (bending angle) may freely be set steplessly within a predetermined range or may be set at a plurality of steps (plural angles) within a predetermined range. Further, the bending portion 13 can be bent in a plurality of directions (for example, the upward and downward directions in FIG. 1) from the straightened state or can be bent in only one direction (for example, only the upward direction or the downward direction in FIG. 1).

Figure 2:
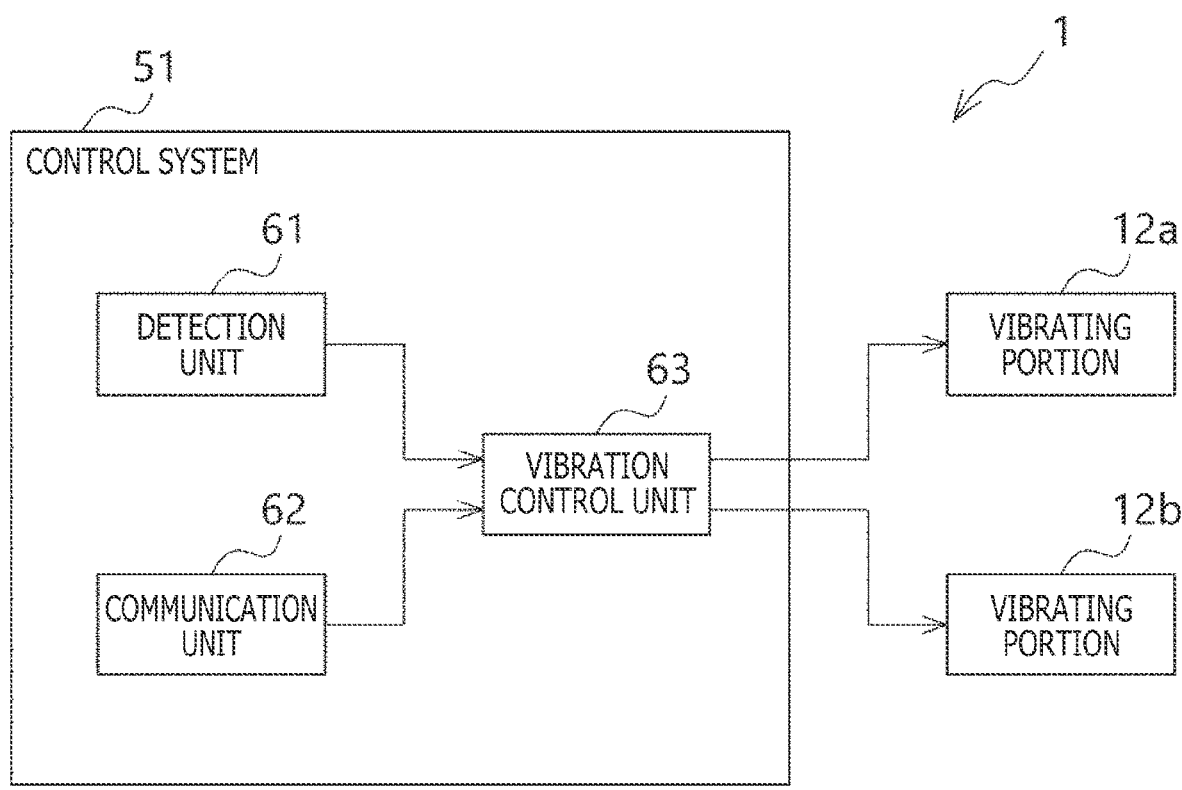
FIG. 2 is a block diagram illustrating a configuration example of a control system of the tactile presentation apparatus in FIG. 1.

FIG. 2 is a block diagram illustrating a configuration example of a control system 51 of the tactile presentation apparatus 1. The control system 51 includes a detection unit 61, a communication unit 62, and a vibration control unit 63.

The detection unit 61 includes an angle sensor, for example, and detects the bending angle of the bending portion 13. Further, the detection unit 61 includes, for example, an acceleration sensor, an angular velocity sensor, a geomagnetic sensor, and the like and detects the movement of the tactile presentation apparatus 1. The detection unit 61 supplies the vibration control unit 63 with data indicating the detection result.

The communication unit 62 includes a communication device, for example, and communicates with an external apparatus, thereby carrying out transmission and reception of various kinds of data. Incidentally, the communication method of the communication unit 62 is not particularly limited.

The vibration control unit 63 includes, for example, a processor, such as a CPU (Central Processing Unit), and controls the vibration of the vibrating portion 12a and the vibrating portion 12b on the basis of the bending angle of the bending portion 13, the movement of the tactile presentation apparatus 1, data from the outside, and the like. For example, the vibration control unit 63 controls one or more of the frequencies, amplitudes, phases, and patterns of the vibration of the vibrating portions 12a and 12b via an unillustrated signal amplification unit or the like. Here, in the case where a similar vibration is periodically repeated, for example, the vibration pattern is illustrated by a waveform of the vibration that is periodically repeated.

<Operation Example of Tactile Presentation Apparatus 1>

Next, an example of the operation of the tactile presentation apparatus 1 will be described with reference to FIGS. 3A, 3B, 4A, 4B, 5A, 5B, 6, 7, 8A, 8B, and 8C.

For example, while gripping at least one of the grip portion 11a or the grip portion 11b, the user experiences a vibration obtained by combining the vibration of the grip portion 11a caused by the vibrating portion 12a and the vibration of the grip portion 11b caused by the vibrating portion 12b.

Figure 3A:
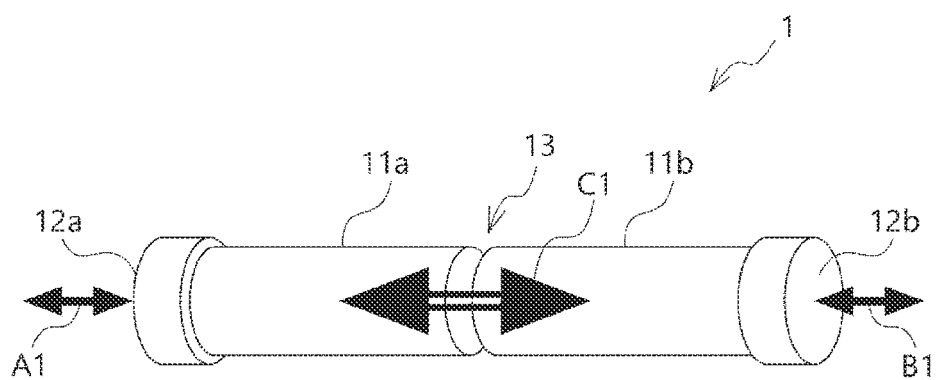
FIGS. 3A and 3B depict diagrams for describing examples of operation of the tactile presentation apparatus in FIG. 1.

For example, as illustrated in FIG. 3A, in a state where the bending portion 13 is straightened, the vibration direction A1 of the vibrating portion 12*a* and the vibration direction B1 of the vibrating portion 12*b* coincide with each other. In this state, when the vibrating portion 12*a* and the vibrating portion 12*b* vibrate at the same frequency and in the same phase, the user feels the vibration in the longitudinal direction C1 of the tactile presentation apparatus 1. Further, due to the vibrations of the vibrating portion 12*a* and the vibrating portion 12*b* at the same frequency and in the same phase, the vibration experienced by the user is amplified.

Figure 3B:
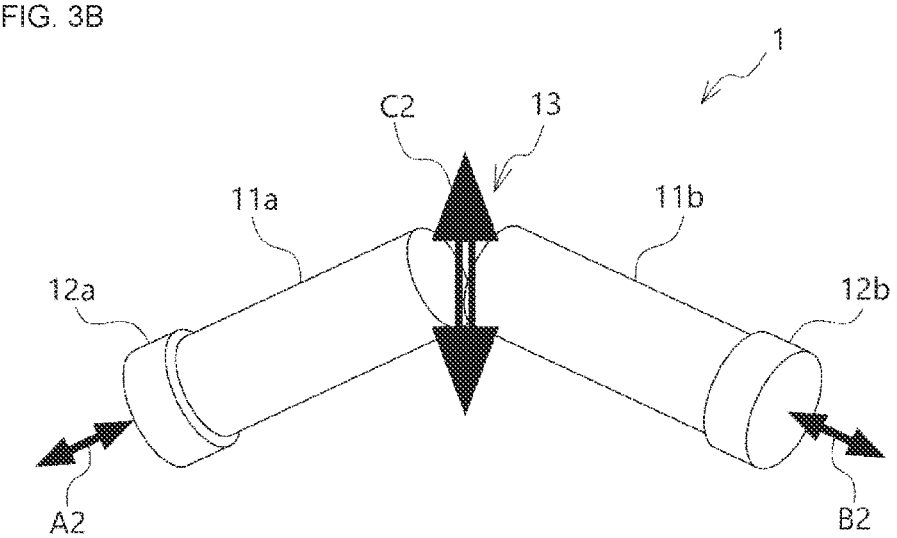

On the other hand, as illustrated in FIG. 3B, in a state where the bending portion 13 is bent, the vibration direction A2 of the vibrating portion 12*a* and the vibration direction B2 of the vibrating portion 12*b* do not agree with each other, and the directions intersect near the bending axis of the bending portion 13. In this state, when the vibrating portion 12*a* and the vibrating portion 12*b* vibrate at the same frequency and in the same phase, the user experiences vibration parallel to the vibration direction C1 in FIG. 3A. On the other hand, in this state, when the vibrating portion 12*a* and the vibrating portion 12*b* vibrate at the same frequency but in opposite phases, the user experiences the vibration in direction C2 that is perpendicular to the vibration direction C1 in FIG. 3A and perpendicular to the bending axis of the bending portion 13.

Figure 4A:
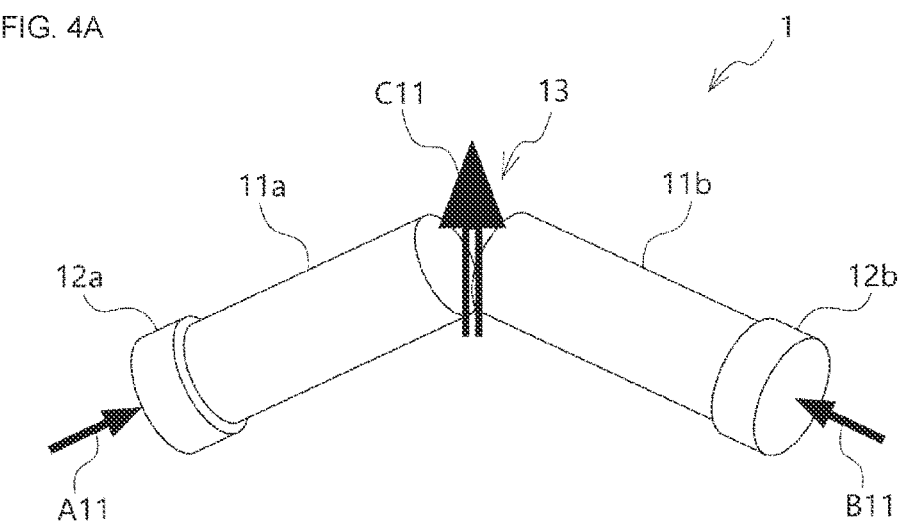
FIGS. 4A and 4B depict diagrams for describing examples of the operation of the tactile presentation apparatus in FIG. 1.
Figure 4B:
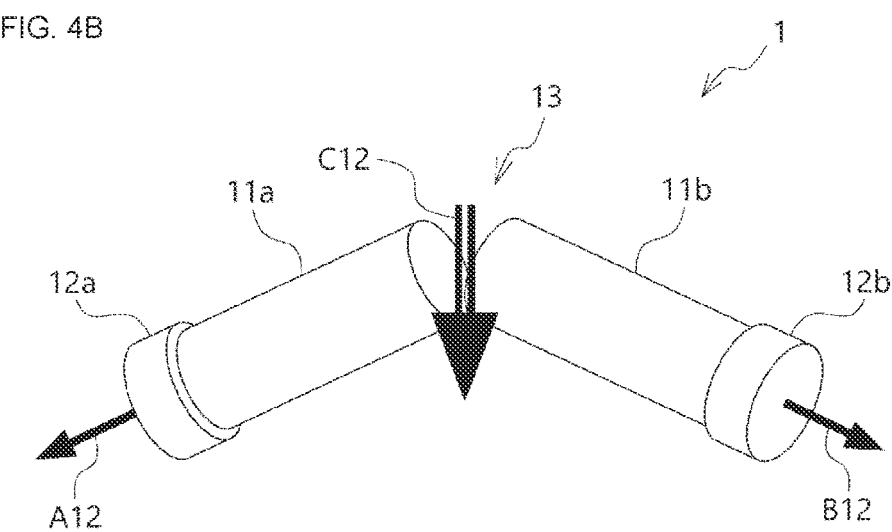

In FIGS. 4A and 4B, FIG. 4A illustrates an example in which the vibrating portion 12*a* applies an impact (single-shot vibration) in the direction A11 toward the bending portion 13 and, at the same time, the vibrating portion 12*b* applies an impact (single-shot vibration) in the direction B11 toward the bending portion 13, in a state where the bending portion 13 is bent. In this case, the user experiences an impact (single-shot vibration) in the direction C11 that is perpendicular to the vibration direction C1 in FIG. 3A, perpendicular to the bending axis of the bending portion 13, and further opposite to the bending direction of the bending portion 13.

In FIGS. 4A and 4B, FIG. 4B illustrates an example in which the vibrating portion 12*a* applies an impact (single-shot vibration) in the direction A12 away from the bending portion 13 and, at the same time, the vibrating portion 12*b* applies an impact (single-shot vibration) in the direction B12 away from the bending portion 13, contrary to the example in FIG. 4A, in a state where the bending portion 13 is bent. In this case, the user experiences a single impact (single-shot vibration) in the direction opposite to that in the example in FIG. 4A. That is, the user experiences an impact (single-shot vibration) in the direction C12 that is perpendicular to the vibration direction C1 in FIG. 4A, perpendicular to the bending axis of the bending portion 13, and further in the same direction as the bending direction of the bending portion 13.

Figure 5A:
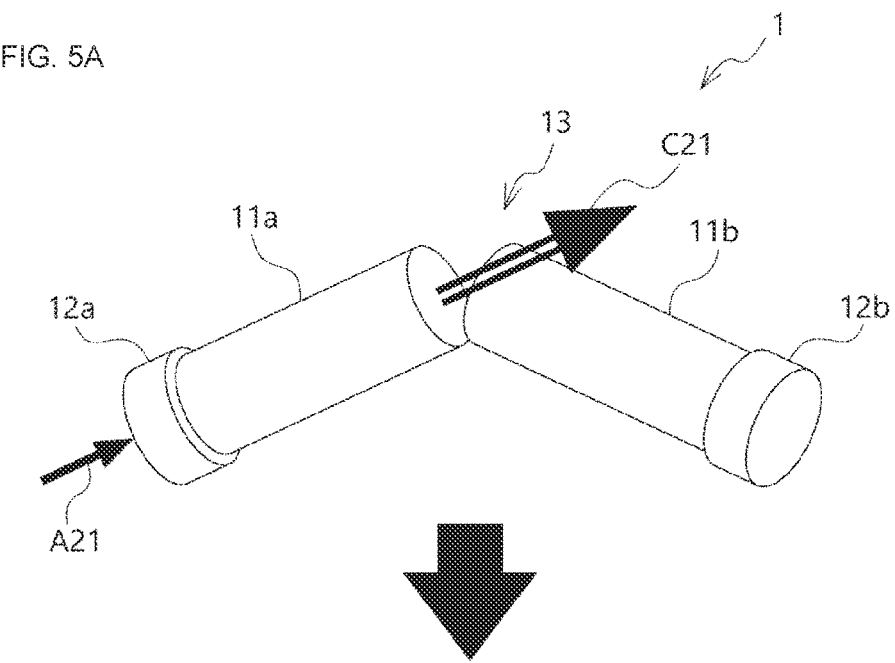
FIGS. 5A and 5B depict diagrams for describing examples of the operation of the tactile presentation apparatus in FIG. 1.
Figure 5B:
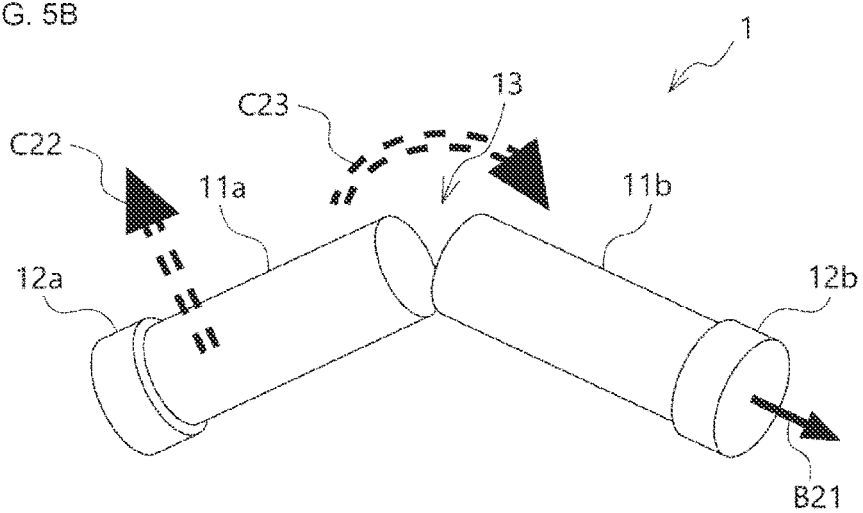

FIGS. 5A and 5B illustrate an example in the case where the timing at which the vibrating portion 12*a* vibrates and the timing at which the vibrating portion 12*b* vibrates are made different from each other.

First, as illustrated in FIG. 5A, in a state where the bending portion 13 is bent, the vibrating portion 12*a* applies an impact (single-shot vibration) in the direction A21 toward the bending portion 13. As a result, the user experiences an impact (single-shot vibration) in the same direction C21 as the direction A21.

Next, as illustrated in FIG. 5B, while the bending portion 13 is kept bent, the vibrating portion 12*b* applies an impact (single-shot vibration) in the direction B21 away from the bending portion 13. An impact in the same direction as the direction B21 is thereby applied to the grip portion 11*b*, and at the same time, a force that performs pseudo-rotation around the bending portion 13 is applied to the grip portion 11*a* in the direction C22 opposite to the direction in which the bending portion 13 is bent. Due to this, the user feels the impact (single-shot vibration) of the tactile presentation apparatus 1 rotating in the clockwise direction C23 in the figure.

Next, a case where the vibration frequencies of the vibrating portion 12*a* and the vibrating portion 12*b* are different from each other will be described with reference to FIGS. 6 and 7.

Figure 6:
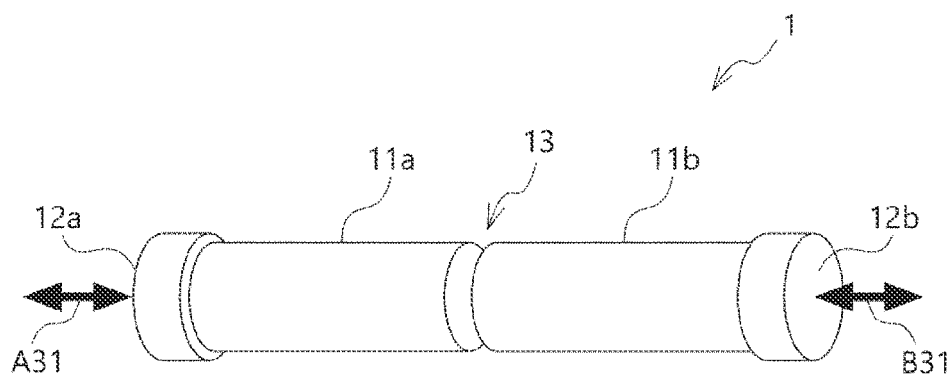
FIG. 6 is a diagram for describing an example of the operation of the tactile presentation apparatus in FIG. 1.

For example, as illustrated in FIG. 6, in a state where the bending portion 13 is straightened, the vibration direction A31 of the vibrating portion 12*a* and the vibration direction B31 of the vibrating portion 12*b* coincide with each other. In this state, when the user grips the grip portion 11*a* and the grip portion 11*b* with different hands respectively and makes the vibration frequency of the vibrating portion 12*a* different from the vibration frequency of the vibrating portion 12*b*, the user experiences the vibration of the frequency of difference between the vibration frequency of the vibrating portion 12*a* and the vibration frequency of the vibrating portion 12*b*. For example, in the case where the vibration frequency of the vibrating portion 12*a* is 100 Hz and the vibration frequency of the vibrating portion 12*b* is 101 Hz, the user experiences a vibration of 1 Hz (variation in strength at 1 Hz).

Figure 7:
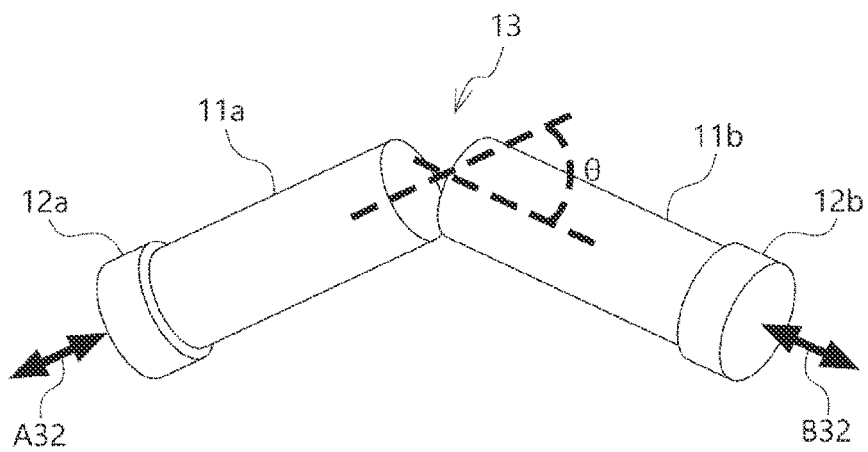
FIG. 7 is a diagram for describing an example of the operation of the tactile presentation apparatus in FIG. 1.

Further, for example, as illustrated in FIG. 7, in a state where the bending portion 13 is bent, the vibration direction A32 of the vibrating portion 12*a* and the vibration direction B32 of the vibrating portion 12*b* do not coincide with each other. In this state, when the user grips the grip portion 11*a* and the grip portion 11*b* with different hands respectively and makes the vibration frequency of the vibrating portion 12*a* different from the vibration frequency of the vibrating portion 12*b*, the user experiences different tactile sensations depending on the bending angle θ of the bending portion 13. For example, in the case where the vibration frequency of the vibrating portion 12*a* is 100 Hz, the vibration frequency of the vibrating portion 12*b* is 101 Hz, and the bending angle θ is 30 degrees, the user feels a rotational motion that draws a circle at 1 Hz. On the other hand, for example, in the case where the vibration frequency of the vibrating portion 12*a* is 100 Hz, the vibration frequency of the vibrating portion 12*b* is 101 Hz, and the bending angle θ is 60 degrees, the user feels a vibration of 1 Hz, but scarcely feels any rotational movement.

Further, for example, the vibration control unit 63 may change the vibrations of the vibrating portion 12*a* and the vibrating portion 12*b* on the basis of the bending angle of the bending portion 13 detected by the detection unit 61.

Figure 8A:
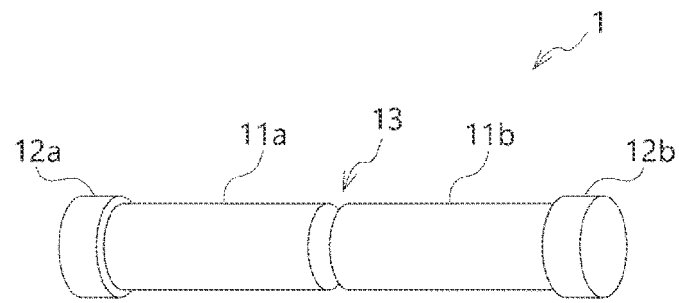
FIGS. 8A, 8B, and 8C depict diagrams for describing examples of the operation of the tactile presentation apparatus in FIG. 1.
Figure 8B:
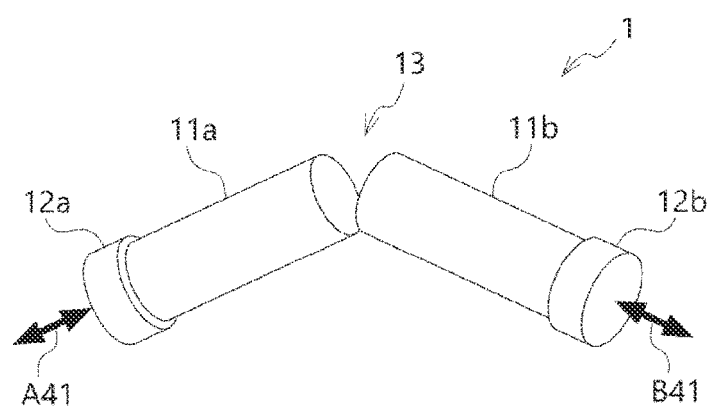
Figure 8C:
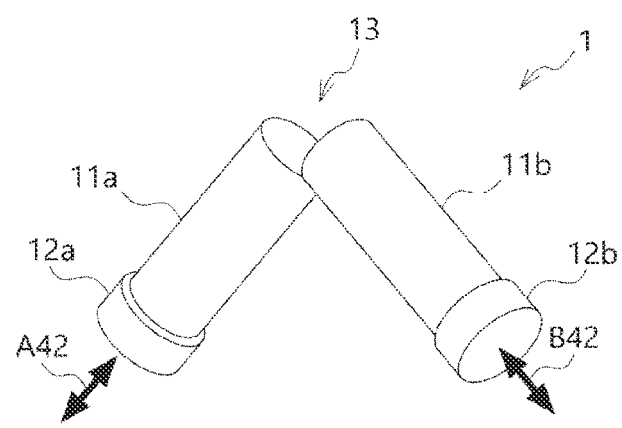

For example, the vibration control unit 63 may change the vibration intensities (amplitudes) of the vibrating portion 12*a* and the vibrating portion 12*b*, depending on the bending angle. To be specific, as illustrated in FIG. 8A, for example, in the case where the bending angle is 0 degrees, the vibration control unit 63 does not vibrate the vibrating portion 12*a* nor the vibrating portion 12*b*. On the other hand, as illustrated in FIGS. 8B and 8C, in the case where the bending portion 13 is bent, the vibration control unit 63 vibrates the vibrating portion 12*a* and the vibrating portion 12*b* at the same frequency and in the same phase. At this time, the vibration control unit 63 increases the vibration intensities of the two as the bending angle increases. For example, the vibration control unit 63 makes the intensities of vibrations in the directions A42 and B42 in the case where the bending angle is 60 degrees as illustrated in FIG. 8C larger than the intensities of vibrations in the directions A41 and B41 in the case where the bending angle is 30 degrees as illustrated in FIG. 8B.

As a result, the user feels stronger vibration as the bending portion 13 is bent more, and the user comes to feel an elastic feeling with respect to the bending portion 13.

Note that, in addition to the vibration intensity, the vibration control unit 63 may control the vibration frequency, the vibration pattern, the phase difference between the vibrating portion 12a and the vibrating portion 12b, and the like on the basis of the bending angle. Further, the vibration control unit 63 may control two or more of the parameters such as the vibration intensity, the vibration frequency, the vibration pattern, and the phase difference on the basis of the bending angle. This makes it possible to present the elastic feeling of the bending portion 13, for example, in more detail.

As described above, even if the vibrations of the vibrating portion 12a and the vibrating portion 12b are constant, the tactile sensation felt by the user is changed by bending or straightening the bending portion 13. As a result, the types of tactile sensations that the tactile presentation apparatus 1 can present by vibration increase.

Further, the tactile sensation felt by the user can be changed by changing the vibration intensity, the vibration frequency, the vibration pattern, the phase difference and the like of the vibrating portion 12a and the vibrating portion 12b. As a result, the types of tactile sensations that the tactile presentation apparatus 1 can present by vibration are further increased.

Then, by combining the change in the shape of the tactile presentation apparatus 1 caused by the bending and straightening of the bending portion 13 and the change in the tactile sensation presented by the tactile presentation apparatus 1, the range of representation of the tactile presentation apparatus 1 is expanded. Utilizing this, for example, the user can use the tactile presentation apparatus 1 as a different item by adjusting the bending angle of the bending portion 13 of the tactile presentation apparatus 1.

For example, the user may be able to use the tactile presentation apparatus 1 as a sword or a gun, according to the scene while watching a play or a movie. For example, in a sword fight scene, the user straightens the tactile presentation apparatus 1 and uses the tactile presentation apparatus 1 as a sword in response to the movement of the enemy played by an actor. On the other hand, for example, in a shooting battle scene, the user bends the bending portion 13 of the tactile presentation apparatus 1 and uses the tactile presentation apparatus 1 as a gun.

In this case, for example, the vibration control unit 63 generates vibrations according to the set item (sword or gun) in the vibrating portion 12a and the vibrating portion 12b, according to the movement of the tactile presentation apparatus 1 detected by the detection unit 61. Further, for example, the vibration control unit 63 generates vibrations according to the set item (sword or gun) in the vibrating portion 12a and the vibrating portion 12b, according to the scene of the play or the movie, on the basis of the data received from the outside by the communication unit 62. This improves the realistic sensations regarding the play or the movie that the user is watching.

Further, for example, in a walk-through attraction of an amusement park, a theme park, or the like, the user may adjust the bending angle of the bending portion 13 of the tactile presentation apparatus 1 for each area so that the user can use the device as a different item. For example, the tactile presentation apparatus 1 may operate as a cane with the bending portion 13 straightened, may operate as an operating stick with the bending angle of the bending portion 13 set to 30 degrees, and may operate as a bow and an arrow with the bending angle of the bending portion 13 set to 90 degrees.

In this case, for example, the vibration control unit 63 generates vibrations according to the set item (cane, operating stick, or bow and arrow) in the vibrating portion 12a and the vibrating portion 12b, according to the movement of the tactile presentation apparatus 1 detected by the detection unit 61. Further, for example, the vibration control unit 63 generates vibrations according to an item (cane, operating stick, or bow and arrow) in the vibrating portion 12a and the vibrating portion 12b, according to the content of the attraction in each area, on the basis of the data received by the communication unit 62 from the outside. This improves the realistic sensations in the attraction.

It should be noted that the type of item represented by the tactile presentation apparatus 1 is not limited to the above-mentioned examples. For example, the tactile presentation apparatus 1 may operate as a steering wheel with the bending portion 13 bent and may operate as a rein with the bending portion 13 straightened.

2. SECOND EMBODIMENT

Next, the second embodiment of the present technology will be described with reference to FIGS. 9A, 9B, 10A and 10B.

Figure 9A:
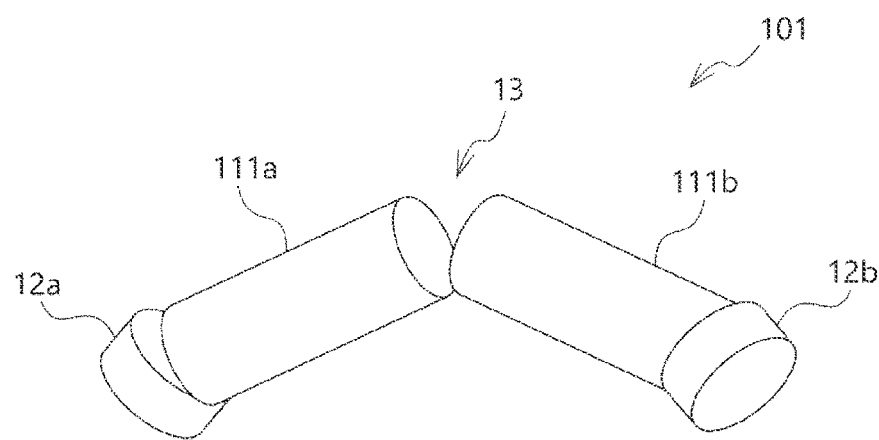
FIGS. 9A and 9B depict diagrams illustrating a second embodiment of the tactile presentation apparatus to which the present technology is applied.
Figure 9B:
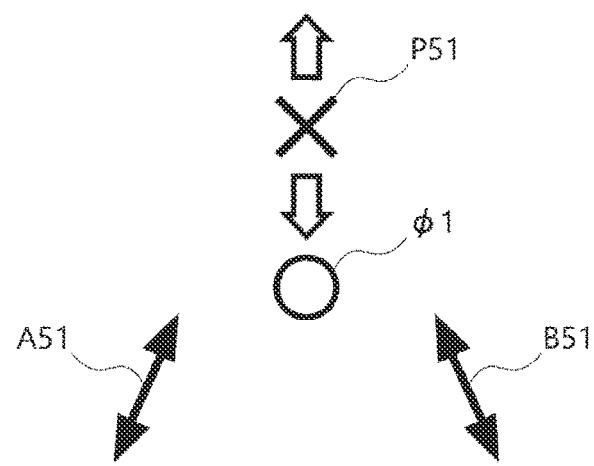

In FIGS. 9A and 9B, FIG. 9A is an external view schematically illustrating a configuration example of a tactile presentation apparatus 101 to which the present technology is applied. Note that, in the figure, the parts corresponding to those of the tactile presentation apparatus 1 in FIG. 1 are designated by the same reference signs.

The tactile presentation apparatus 101 is coincident with the tactile presentation apparatus 1 in that the vibrating portion 12a, vibrating portion 12b, and bending portion 13 are provided but is different therefrom in that a grip portion 111a and a grip portion 111b are provided in place of the grip portion 11a and the grip portion 11b.

The grip portion 111a and the grip portion 111b have substantially the same shape as the grip portion 11a and the grip portion 11b of the tactile presentation apparatus 1, but the shapes of the portions where the vibrating portion 12a and the vibrating portion 12b are provided are different.

In addition, the vibrating portion 12a gives vibration to the grip portion 111a in a direction oblique to the longitudinal direction of the grip portion 111a on a plane on which the tactile presentation apparatus 101 performs bending motion (a plane on which the grip portion 111a and the grip portion 111b rotate via the bending portion 13). Similarly, the vibrating portion 12b gives vibration to the grip portion 111b in a direction oblique to the longitudinal direction of the grip portion 111b on a plane on which the tactile presentation apparatus 101 performs bending motion. Therefore, as illustrated in FIG. 9B, the vibration direction A51 of the vibrating portion 12a (grip portion 111a) and the vibration direction B51 of the vibrating portion 12b (grip portion 111b) are perpendicular to the bending axis $\phi1$ of the bending portion 13, but the intersection P51 of the vibration direction A51 and the vibration direction B51 does not overlap with the bending axis $\phi1$.

The intersection P51 moves away from the bending axis $\phi1$ as the bending angle of the bending portion 13 increases and approaches the bending axis $\phi1$ as the bending angle of the bending portion 13 decreases. Accordingly, as compared with the case where the intersection P51 and the bending axis ϕ1 overlap as in the tactile presentation apparatus 1, the change of the vibration felt by the user (the vibration obtained by combining the vibration of the vibrating portion 12a and the vibration of the vibrating portion 12b) due to the bending angle becomes large. In addition, the degree of freedom in designing the relation between the tactile sensation intended to be experienced by the user and the bending angle is enhanced.

Note that at least one of the vibration direction A51 of the vibrating portion 12a or the vibration direction B51 of the vibrating portion 12b may be made not to be perpendicular to the bending axis ϕ1.

Figure 10A:
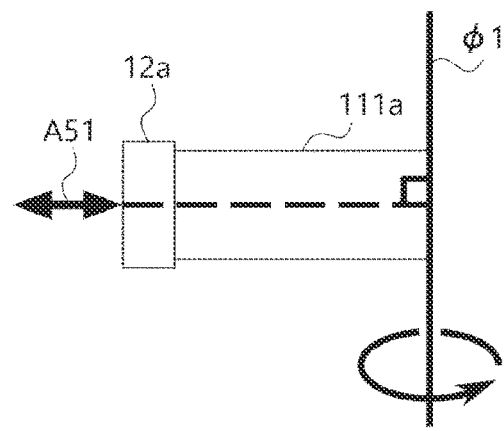
FIGS. 10A and 10B depict diagrams illustrating examples of the relation between the vibration direction and the bending axis of the tactile presentation apparatus in FIGS. 9A and 9B.
Figure 10B:
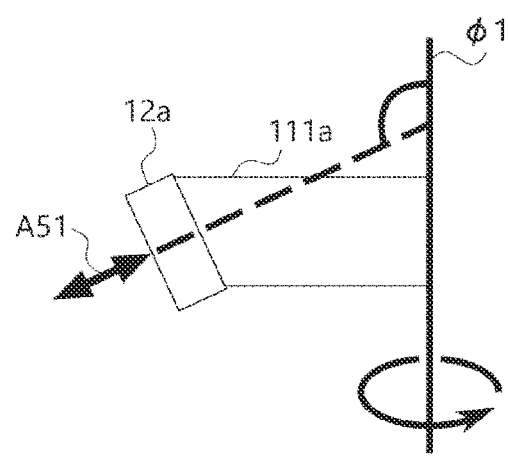

In FIGS. 10A and 10B, FIG. 10A illustrates an example in the case where the vibration direction A51 of the vibrating portion 12a is perpendicular to the bending axis ϕ1. Although not illustrated, the vibration direction B51 of the vibrating portion 12b is also perpendicular to the bending axis ϕ1. In this case, the direction of the vibration obtained by combining the vibration of the vibrating portion 12a and the vibration of the vibrating portion 12b is parallel to the plane on which the tactile presentation apparatus 101 performs the bending motion. Then, for example, by bending the bending portion 13, the user feels a tactile sensation of moving back and forth on a plane on which the tactile presentation apparatus 101 performs the bending motion.

On the other hand, in FIGS. 10A and 10B, FIG. 10B illustrates an example in the case where the vibration direction A51 of the vibrating portion 12a is not perpendicular to the bending axis ϕ1. Although not illustrated, the vibration direction B51 of the vibrating portion 12b is also not perpendicular to the bending axis ϕ1. In this case, the direction of the vibration obtained by combining the vibration of the vibrating portion 12a and the vibration of the vibrating portion 12b is different from the direction parallel to the plane on which the tactile presentation apparatus 101 performs the bending motion. Then, for example, by bending the bending portion 13, the user can feel the movement in a direction different from that of the plane on which the tactile presentation apparatus 101 performs the bending motion (for example, a feeling of rising and a feeling of falling).

Incidentally, the vibration direction A51 of the vibrating portion 12a and the vibration direction B51 of the vibrating portion 12b are not necessarily required to intersect at one point, and the vibration direction A51 and the vibration direction B51 may be configured not to intersect at one point.

3. THIRD EMBODIMENT

Next, the third embodiment of the present technology will be described with reference to FIG. 11.

Figure 11:
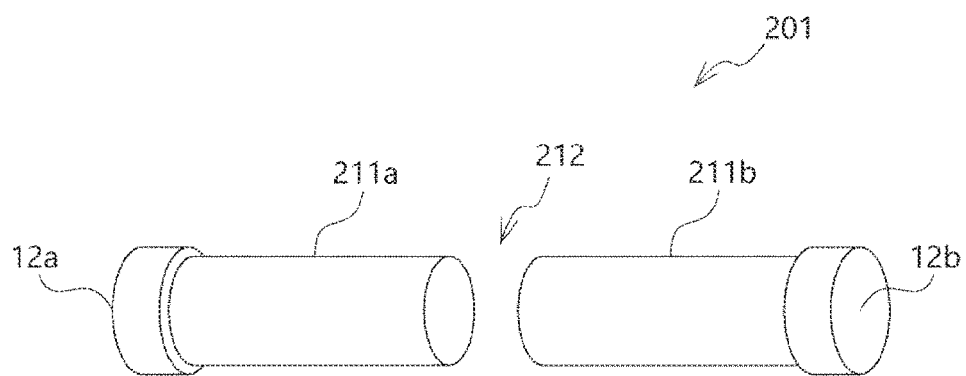
FIG. 11 is an external view schematically illustrating a configuration example of a third embodiment of the tactile presentation apparatus to which the present technology is applied.

FIG. 11 is an external view schematically illustrating a configuration example of a tactile presentation apparatus 201 to which the present technology is applied. Incidentally, in the figure, the parts corresponding to those of the tactile presentation apparatus 1 in FIG. 1 are designated by the same reference signs.

The tactile presentation apparatus 201 is significantly different from the tactile presentation apparatus 1 in that a grip portion 211a and a grip portion 211b can be separated.

To be specific, the tactile presentation apparatus 201 is coincident with the tactile presentation apparatus 1 in that the vibrating portion 12a and the vibrating portion 12b are provided but is different therefrom in that the grip portion 211a, the grip portion 211b, and a bending portion 212 are provided in place of the grip portion 11a, the grip portion 11b, and the bending portion 13.

The grip portion 211a and the grip portion 211b have substantially the same shape as the grip portion 11a and the grip portion 11b of the tactile presentation apparatus 1. However, as described above, in the tactile presentation apparatus 201, the grip portion 211a and the grip portion 211b can be attached to and detached from each other at the bending portion 212 which is the contact portion between the grip portion 211a and the grip portion 211b. Further, the bending portion 212 is configured by connecting the grip portion 211a and the grip portion 211b.

4. FOURTH EMBODIMENT

Next, the fourth embodiment of the present technology will be described with reference to FIGS. 12, 13A, 13B, and 13C.

Figure 12:
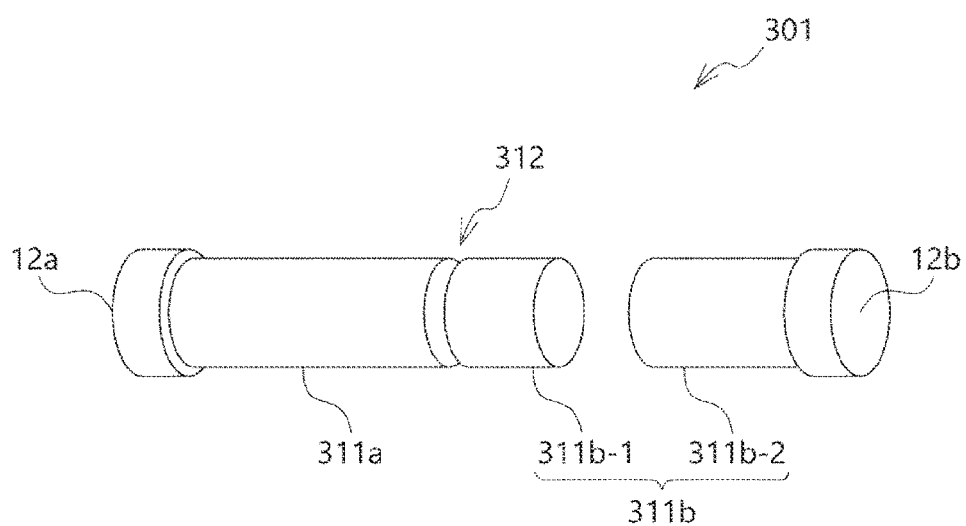
FIG. 12 is an external view schematically illustrating a configuration example of a fourth embodiment of the tactile presentation apparatus to which the present technology is applied.

FIG. 12 is an external view schematically illustrating a configuration example of a tactile presentation apparatus 301 to which the present technology is applied. Incidentally, in the figure, the parts corresponding to those of the tactile presentation apparatus 1 in FIG. 1 are designated by the same reference signs.

The tactile presentation apparatus 301 is different from the tactile presentation apparatus 1 in that a grip portion 311b can be separated into a first portion 311b-1 and a second portion 311b-2.

To be specific, the tactile presentation apparatus 301 is coincident with the tactile presentation apparatus 1 in that the vibrating portion 12a and the vibrating portion 12b are provided but is different therefrom in that a grip portion 311a, the grip portion 311b, and a bending portion 312 are provided, in place of the grip portion 11a, the grip portion 11b, and the bending portion 13.

The grip portion 311a and the grip portion 311b have a shape similar to that of the grip portion 11a and the grip portion 11b of the tactile presentation apparatus 1. However, unlike the grip portion 11a and the grip portion 11b, the grip portion 311b can be separated into the first portion 311b-1 and the second portion 311b-2 at the middle in the longitudinal direction.

The vibrating portion 12a is provided at one end of the grip portion 311a, and the other end of the grip portion 311a is connected to one end of the grip portion 311b via the bending portion 312. The vibrating portion 12b is provided at the other end of the grip portion 311b.

The vibrating portion 12a gives vibration to the grip portion 311a in the longitudinal direction. Due to this, the grip portion 311a vibrates in the longitudinal direction.

The vibrating portion 12b gives vibration to the grip portion 311b in the longitudinal direction. As a result, the grip portion 311b vibrates in the longitudinal direction.

The bending portion 312 has a configuration similar to that of the bending portion 13 of the tactile presentation apparatus 1.

Figure 13A:
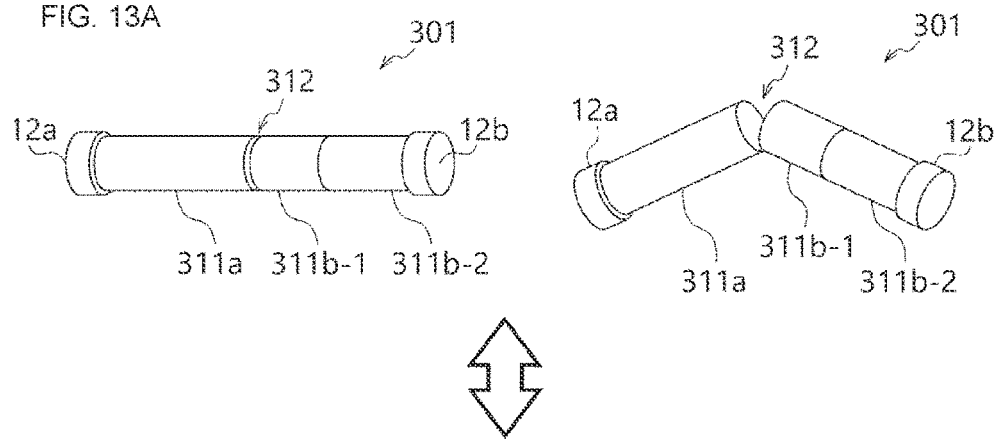
FIGS. 13A, 13B, and 13C depict diagrams illustrating examples of the method of connecting grip portions of the tactile presentation apparatus in FIG. 12.
Figure 13B:
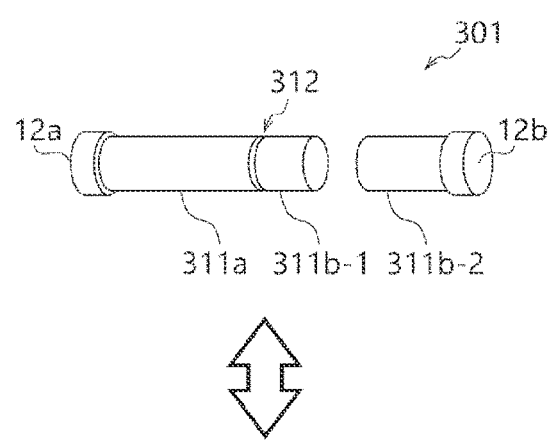
Figure 13C:
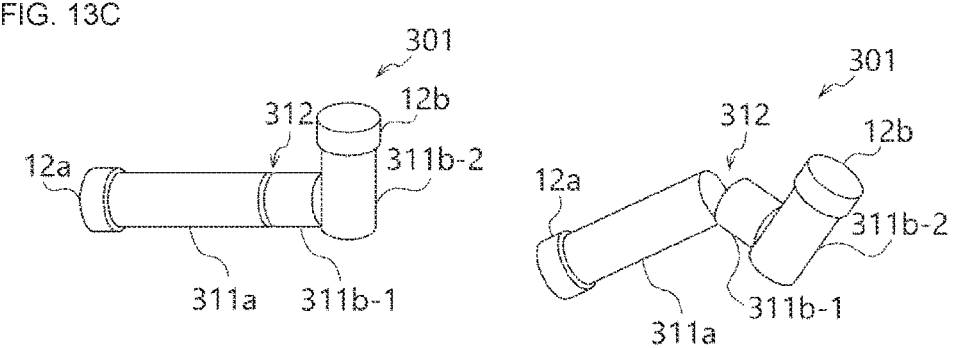

It should be noted that, as illustrated in FIGS. 13A, 13B, and 13C, the first portion 311b-1 and the second portion 311b-2 may be configured so that the connecting directions thereof are variable.

For example, the first portion 311b-1 and the second portion 311b-2 are made connectable so that the longitudinal direction of the first portion 311b-1 and the longitudinal direction of the second portion 311b-2 are made to agree with each other as illustrated in FIG. 13A, from the state where the first portion 311b-1 and the second portion 311b-2 are separated as illustrated in FIG. 13B. In the state illustrated in FIG. 13A, the tactile presentation apparatus 301 operates in a manner similar to that of the tactile presentation apparatus 1.

Further, for example, as illustrated in FIG. 13C, the first portion 311b-1 and the second portion 311b-2 are made connectable so that the longitudinal direction of the first portion 311b-1 and the longitudinal direction of the second portion 311b-2 do not agree with each other. In this example, one end of the first portion 311b-1 and the side surface of the second portion 311b-2 are connected so that the longitudinal direction of the first portion 311b-1 and the longitudinal direction of the second portion 311b-2 are perpendicular to each other.

Due to this, the vibration direction of the vibrating portion 12a (grip portion 311a) and the vibration direction of the vibrating portion 12b (grip portion 311b) are perpendicular to each other, and the directions thereof do not intersect at one point. As a result, it becomes possible to present the user with a tactile sensation different from that in the state in FIG. 13A.

Note that the connecting direction between the first portion 311b-1 and the second portion 311b-2 is not limited to this example and can be changed freely. For example, the first portion 311b-1 and the second portion 311b-2 may be configured to be capable of being connected so that the longitudinal direction of the second portion 311b-2 is oblique to the longitudinal direction of the first portion 311b-1.

Further, the connecting position of the second portion 311b-2 is not limited to this example and can be changed freely. For example, the side surface of the first portion 311b-1 and one end of the second portion 311b-2 may be connected.

As described above, by changing the connecting direction and the connecting position of the first portion 311b-1 and the second portion 311b-2 of the grip portion 311b, the shape of the tactile presentation apparatus 301 and the tactile sensation presented by the tactile presentation apparatus 301 can be changed. Due to this, the types of items that can be represented by the tactile presentation apparatus 301 increase. In addition, the degree of freedom in how to hold the tactile presentation apparatus 301 is enhanced.

5. FIFTH EMBODIMENT

Next, the fifth embodiment of the present technology will be described with reference to FIG. 14.

Figure 14:
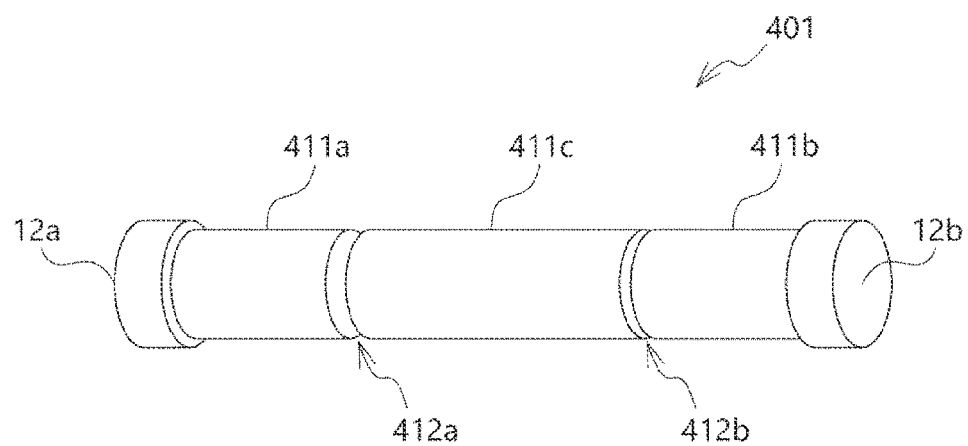
FIG. 14 is an external view schematically illustrating a configuration example of a fifth embodiment of the tactile presentation apparatus to which the present technology is applied.

FIG. 14 is an external view schematically illustrating a configuration example of a tactile presentation apparatus 401 to which the present technology is applied. Note that, in the figure, the parts corresponding to those of the tactile presentation apparatus 1 in FIG. 1 are designated by the same reference signs.

The tactile presentation apparatus 401 has a different number of bending portions as compared to the tactile presentation apparatus 1.

To be specific, the tactile presentation apparatus 401 is coincident with the tactile presentation apparatus 1 in that the vibrating portion 12a and the vibrating portion 12b are provided but is different therefrom in that grip portions 411a to 411c, a bending portion 412a, and a bending portion 412b are provided in place of the grip portion 11a, the grip portion 11b, and the bending portion 13.

The grip portion 411a and the grip portion 411b include rod-shaped members having the same length and same cross-sectional radius. The grip portion 411c includes a rod-shaped member having the same cross-sectional radius as the grip portion 411a and the grip portion 411b.

The grip portion 411c is arranged between the grip portion 411a and the grip portion 411b. To be specific, the vibrating portion 12a is provided at one end of the grip portion 411a, and the other end of the grip portion 411a is connected to one end of the grip portion 411c via the bending portion 412a. The other end of the grip portion 411c is connected to one end of the grip portion 411b via the bending portion 412b. The vibrating portion 12b is provided at the other end of the grip portion 411b.

The vibrating portion 12a gives vibration to the grip portion 411a in the longitudinal direction. Due to this, the grip portion 411a vibrates in the longitudinal direction.

The vibrating portion 12b gives vibration to the grip portion 411b in the longitudinal direction. The grip portion 411b thereby vibrates in the longitudinal direction.

The bending portion 412a and the bending portion 412b have a configuration similar to that of the bending portion 13 of the tactile presentation apparatus 1.

When the bending portion 412a bends around a predetermined bending axis, the angle between the grip portion 411a and the grip portion 411c changes, and the relative directions between the grip portion 411a, the grip portion 411b, and the grip portion 411c change. Further, when the bending portion 412b bends around a predetermined bending axis, the angle between the grip portion 411b and the grip portion 411c changes, and the relative directions between the grip portion 411b, the grip portion 411a, and the grip portion 411c change.

By providing the two bending portions, which are the bending portion 412a and the bending portion 412b, in such way, the combinations of the vibration direction of the vibrating portion 12a and the vibration direction of the vibrating portion 12b can be increased. As a result, the types of tactile sensations that can be presented increase. Further, the tactile sensation felt by the user changes depending on which one of the grip portions 411a to 411c is gripped by the user.

Note that the bending axis of the bending portion 412a and the bending axis of the bending portion 412b do not necessarily have to be parallel. In the case where the bending axis of the bending portion 412a and the bending axis of the bending portion 412b are parallel, the grip portion 411a and the grip portion 411b rotate on the same plane. In this case, the tactile presentation apparatus 401 can allow the user to feel, by vibration, a two-dimensional movement on a plane in which the grip portion 411a and the grip portion 411b rotate, for example.

On the other hand, in the case where the bending axis of the bending portion 412a and the bending axis of the bending portion 412b are not parallel, the grip portion 411a and the grip portion 411b rotate on different planes. In this case, the tactile presentation apparatus 401 can allow the user to feel the three-dimensional movement by vibration, without being limited to the plane on which the grip portion 411a rotates and the plane on which the grip portion 411b rotates, for example.

The number of bending portions can also be set to three or more.

6. SIXTH EMBODIMENT

Next, the sixth embodiment of the present technology will be described with reference to FIG. 15.

Figure 15:
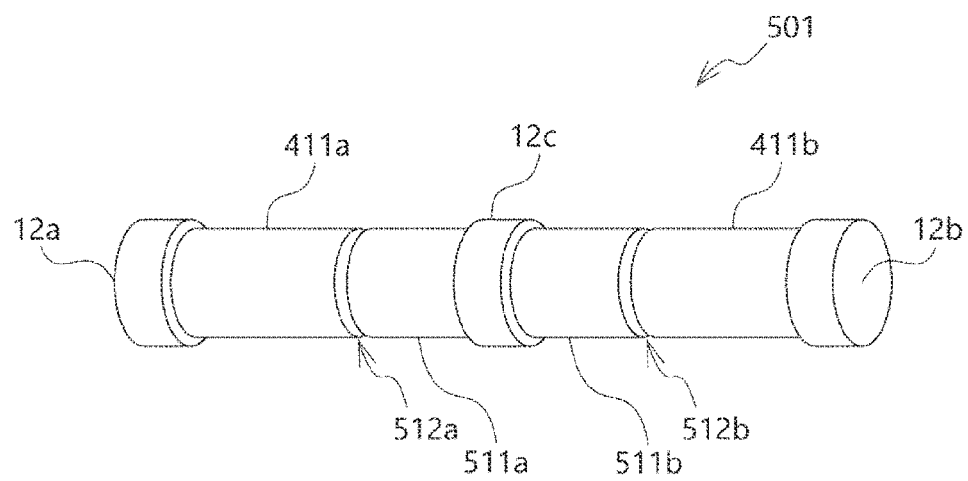
FIG. 15 is an external view schematically illustrating a configuration example of a sixth embodiment of the tactile presentation apparatus to which the present technology is applied.

FIG. 15 is an external view schematically illustrating a configuration example of a tactile presentation apparatus 501 to which the present technology is applied. Incidentally, in the figure, the parts corresponding to those of the tactile presentation apparatus 401 in FIG. 14 are designated by the same reference signs.

The tactile presentation apparatus 501 has a different number of vibrating portions as compared to the tactile presentation apparatus 401.

To be specific, the tactile presentation apparatus 501 is coincident with the tactile presentation apparatus 401 in that the vibrating portion 12a, the vibrating portion 12b, the grip portion 411a, and the grip portion 411b are provided but is different therefrom in that a vibrating portion 12c, a grip portion 511a, a grip portion 511b, a bending portion 512a, and a bending portion 512b are provided in place of the grip portion 411c, the bending portion 412a, and the bending portion 412b.

The grip portion 511a and the grip portion 511b include rod-shaped members having the same length as each other and the same cross-sectional radius as the grip portion 411a and the grip portion 411b. One end of the grip portion 511a is connected to one end of the grip portion 411a, which is different from the one end provided with the vibrating portion 12a, via the bending portion 512a. The other end of the grip portion 511a is connected to one end of the cylindrical vibrating portion 12c. One end of the grip portion 511b is connected to the other end of the vibrating portion 12c. The other end of the grip portion 511b is connected to one end of the grip portion 411b, which is different from the one end provided with the vibrating portion 12b, via the bending portion 512b.

Similarly to the vibrating portion 12a and the vibrating portion 12b, the vibrating portion 12c includes, for example, a vibrating device, such as an actuator, and generates vibration in a direction parallel to the side surface of the cylinder, thereby giving vibration to the grip portion 511a and the grip portion 511b in the longitudinal direction. Due to this, the grip portion 511a and the grip portion 511b vibrate in the longitudinal direction. Then, the grip portion 411a, the grip portion 411b, and the grip portions 511a and 511b vibrate individually.

The bending portion 512a and the bending portion 512b have a configuration similar to that of the bending portion 13 of the tactile presentation apparatus 1.

When the bending portion 512a bends around a predetermined bending axis, the angle between the grip portion 411a and the grip portion 511a changes, and the relative directions among the grip portion 411a, grip portion 511a, grip portion 511b, and grip portion 411b change. Further, when the bending portion 512b bends around a predetermined bending axis, the angle between the grip portion 411b and the grip portion 511b changes, and the relative directions between the grip portion 411b, the grip portion 511a, the grip portion 511b, and the grip portion 411a change.

As described above, in the tactile presentation apparatus 501, the three vibrating portions 12a to 12c are arranged on different three axes, which are an axis formed by the grip portion 411a, an axis formed by the grip portion 411b, and an axis formed by the grip portion 511a and the grip portion 511b, respectively. This makes it possible to present more complex tactile sensations. For example, by causing the vibrating portions 12a to 12c to give impacts (single-shot vibrations) at different timings, more complicated tactile sensations can be given to the user.

7. MODIFICATION EXAMPLES

Hereinafter, modification examples of the above-described embodiments of the present technology will be described.

In the above description, an example of the vibration control unit 63 controlling both the vibrating portion 12a and the vibrating portion 12b has been described, but only one of these portions may be controlled. For example, the vibration control unit 63 may control at least one of the frequency, the phase, the amplitude, or the pattern of the vibration of the vibrating portion 12a, and the vibrating portion 12b may always generate constant vibration.

Further, for example, the vibrating portions 12a to 12c may be provided inside the respective grip portions. Alternatively, for example, the vibrating portions 12a to 12c may each form a grip portion.

Still further, the shapes, lengths, number, etc., of the grip portions can be changed freely. For example, the grip portion may be lengthened, so that the vibrating portion may be provided at a position away from the portion gripped by the user, and then the grip portion may be vibrated in a direction different from the longitudinal direction by the vibrating portion. As a result, the user can perceive a relatively large vibration even with a weak vibration force, and a downsized vibrating portion and reduced power consumption can be achieved.

In addition, the tactile presentation apparatus to which the present technology is applied is not limited to the above-mentioned examples, and it suffices to have at least two individually vibrating members and a bending portion that changes the relative direction between two members by bending between the two members. Further, the two members do not necessarily have to be directly connected and may be indirectly connected via one or more other members. In this case, the bending portion can be placed at any position between the two members.

Further, for example, in the above-described example, an example of a tactile presentation apparatus held by the user with both hands is illustrated, but the present technology can also be applied to a tactile presentation apparatus held by the user with one hand. For example, the user may hold the tactile presentation apparatus with one hand, and the tactile presentation apparatus may present the tactile sensation of a fishing rod.

In addition, the present technology can be applied not only to an apparatus that the user holds and operates in a hand, but also to various apparatuses that are in contact with the user's body and transmit vibration to the contacted portion. For example, the tactile presentation apparatus 1 in FIG. 1 may be mounted horizontally on the upper part of the user's head so that the longitudinal direction agrees with the user's lateral direction (right-left direction). Then, for example, in a state where the bending portion 13 is straightened, the tactile presentation apparatus 1 is vibrated in the right-left direction of the user as illustrated in FIG. 3A, and in a state where the bending portion 13 is bent, the tactile presentation apparatus 1 may be vibrated in the front-back direction of the user as illustrated in FIG. 3B.

Further, the tactile presentation apparatus to which the present technology is applied may be in direct contact with the user's body or may be in indirect contact through clothes or the like.

8. OTHERS

The embodiments of the present technology are not limited to the above-described embodiments, and various changes can be made without departing from the gist of the present technology.

<Example of Configuration Combination>

For example, the present technology can also have the following configurations.

(1)

A tactile presentation apparatus including:
- a first member and a second member that vibrate individually; and
- a first bending portion that bends between the first member and the second member and changes a relative direction between the first member and the second member.

(2)

The tactile presentation apparatus described in the item (1) further including:
- a vibration control unit that controls at least one of a vibration of the first member or a vibration of the second member.

(3)

The tactile presentation apparatus described in the item (2), in which
- the vibration control unit controls at least one of the vibration of the first member or the vibration of the second member, based on a bending angle of the first bending portion.

(4)

The tactile presentation apparatus described in the item (3), further including:
- a detection unit that detects the bending angle.

(5)

The tactile presentation apparatus described in any one of the items (2) to (4), in which
- the vibration control unit controls at least one of the vibration of the first member or the vibration of the second member, based on a movement of the tactile presentation apparatus.

(6)

The tactile presentation apparatus described in any one of the items (2) to (5), in which
- the vibration control unit controls at least one of the vibration of the first member or the vibration of the second member, based on data from an outside.

(7)

The tactile presentation apparatus described in any one of the items (2) to (6), in which
- the vibration control unit controls at least one of a vibration frequency of the first member, a vibration phase of the first member, a vibration amplitude of the first member, a vibration pattern of the first member, a vibration frequency of the second member, a vibration phase of the second member, a vibration amplitude of the second member, or a vibration pattern of the second member.

(8)

The tactile presentation apparatus described in any one of the items (1) to (7), in which
- the first bending portion is provided at a connecting portion between the first member and the second member.

(9)

The tactile presentation apparatus described in the item (8), in which
- the first member and the second member are separable at the first bending portion.

(10)

The tactile presentation apparatus described in any one of the items (1) to (7), further including:
- a third member arranged between the first member and the second member.

(11)

The tactile presentation apparatus described in the item (10), further including:
- a second bending portion that is provided at a connecting portion between the second member and the third member and changes a relative direction between the second member and the third member by being bent,
- in which the first bending portion is provided at a connecting portion between the first member and the third member.

(12)

The tactile presentation apparatus described in the item (10) or (11), in which,
- the first member, the second member, and the third member vibrate individually.

(13)

The tactile presentation apparatus described in any one of the items (1) to (12), in which
- the first member is separable into a first portion and a second portion.

(14)

The tactile presentation apparatus described in the item (13), in which
- at least one of a connecting position or a connecting direction of the first portion and the second portion is changeable.

(15)

The tactile presentation apparatus described in any one of the items (1) to (14), in which
- an intersection point of a direction in which the first member vibrates and a direction in which the second member vibrates overlaps with a bending axis of the first bending portion.

(16)

The tactile presentation apparatus described in any one of the items (1) to (14), in which
- an intersection point of a direction in which the first member vibrates and a direction in which the second member vibrates does not overlap with a bending axis of the first bending portion.

(17)

The tactile presentation apparatus described in any one of the items (1) to (16), in which
- at least one of the direction in which the first member vibrates or the direction in which the second member vibrates is not perpendicular to the bending axis of the first bending portion.

(18)

The tactile presentation apparatus described in any one of the items (1) to (17), further including:
- a first vibrating portion that vibrates the first member; and
- a second vibrating portion that vibrates the second member.

(19)

The tactile presentation apparatus described in any one of the items (1) to (18), in which
- at least one of the first member or the second member is in contact with a user's body.

(20)

A method for controlling tactile presentation performed by a tactile presentation apparatus including a first member and a second member that vibrate individually and a bending portion that bends between the first member and the second member and that changes a relative direction between the first member and the second member, the method comprising:
controlling at least one of a vibration of the first member or a vibration of the second member.

Note that the effects described in the present specification are merely examples and the effects of the technology are not limited thereto, and other effects may be obtained.

REFERENCE SIGNS LIST

1: Tactile presentation apparatus
11a, 11b: Grip portion
12a to 12c: Vibrating portion
13: Bending portion
51: Control system
61: Detection unit
62: Communication unit
63: Vibration control unit
101: Tactile presentation apparatus
111a, 111b: Grip portion
201: Tactile presentation apparatus
211a, 211b: Grip portion
212: Bending portion
301: Tactile presentation apparatus
311a, 311b: Grip portion
311b-1: First portion
311b-2: Second portion
312: Bending portion
401: Tactile presentation apparatus
411a to 411c: Grip portion
412a, 412b: Bending portion
501: Tactile presentation apparatus
511a, 511b: Grip portion
512a, 512b: Bending portion

The invention claimed is:

1. A tactile presentation apparatus, comprising:
a first member configured to vibrate;
a second member configured to vibrate, wherein the first member and the second member vibrate individually;
a first bending portion configured to bend at a bending angle between the first member and the second member to change a relative direction between the first member and the second member; and
a vibration control unit configured to increase at least one of the vibration of the first member or the vibration of the second member based on an increase in the bending angle of the first bending portion.

2. The tactile presentation apparatus according to claim 1, further comprising a detection unit configured to detect the bending angle.

3. The tactile presentation apparatus according to claim 1, wherein the vibration control unit is further configured to control at least one of the vibration of the first member or the vibration of the second member, based on a movement of the tactile presentation apparatus.

4. The tactile presentation apparatus according to claim 1, further comprising a communication unit configured to receive data from outside of the tactile presentation apparatus, wherein the vibration control unit is further configured to control at least one of the vibration of the first member or the vibration of the second member, based on the data received from the outside.

5. The tactile presentation apparatus according to claim 1, wherein the vibration control unit is further configured to control at least one of a vibration frequency of the first member, a vibration phase of the first member, a vibration amplitude of the first member, a vibration pattern of the first member, a vibration frequency of the second member, a vibration phase of the second member, a vibration amplitude of the second member, or a vibration pattern of the second member.

6. The tactile presentation apparatus according to claim 1, wherein the first bending portion is at a connecting portion between the first member and the second member.

7. The tactile presentation apparatus according to claim 6, wherein the first member and the second member are separable at the first bending portion.

8. The tactile presentation apparatus according to claim 1, further comprising a third member between the first member and the second member.

9. The tactile presentation apparatus according to claim 8, further comprising a second bending portion at a connecting portion between the second member and the third member, wherein
the second bending portion is configured to bend to change a relative direction between the second member and the third member, and
the first bending portion is at a connecting portion between the first member and the third member.

10. The tactile presentation apparatus according to claim 8, wherein the first member, the second member, and the third member are configured to vibrate individually.

11. The tactile presentation apparatus according to claim 1, wherein the first member is separable into a first portion and a second portion.

12. The tactile presentation apparatus according to claim 11, wherein at least one of a connecting position or a connecting direction of the first portion and the second portion is changeable.

13. The tactile presentation apparatus according to claim 1, wherein
the first member is configured to vibrate in a first direction,
the second member is configured to vibrate in a second direction, and an intersection point of the first direction and the second direction vibratos overlaps with a bending axis of the first bending portion.

14. The tactile presentation apparatus according to claim 1, wherein
the first member is configured to vibrate in a first direction,
the second member is configured to vibrate in a second direction, and
an intersection point of the first direction and the second direction does not overlap with a bending axis of the first bending portion.

15. The tactile presentation apparatus according to claim 1, wherein
the first member is configured to vibrate in a first direction,
the second member is configured to vibrate in a second direction, and
at least one of the first direction or the second direction is not perpendicular to a bending axis of the first bending portion.

16. The tactile presentation apparatus according to claim 1, further comprising:
a first vibrating portion configured to vibrate the first member; and
a second vibrating portion configured to vibrate the second member.

17. The tactile presentation apparatus according to claim 1, wherein at least one of the first member or the second member is in contact with a user's body.

18. A method for controlling tactile presentation by a tactile presentation apparatus, the method comprising:
   increasing at least one of a vibration of a first member or a vibration of a second member of the tactile presentation apparatus, wherein
     the tactile presentation apparatus comprises:
       the first member and the second member, wherein the first member and the second member vibrate individually,
       a bending portion that bends at a bending angle between the first member and the second member to change a relative direction between the first member and the second member, and
     the increase in the at least one of the vibration of the first member or the vibration of the second member is based on an increase in the bending angle of the bending portion.

* * * * *